April 23, 1968
R. SCHMITZ
3,379,205
PNEUMATIC FORCE BALANCE CONTROLLER
Filed Oct. 12, 1964
2 Sheets-Sheet 1
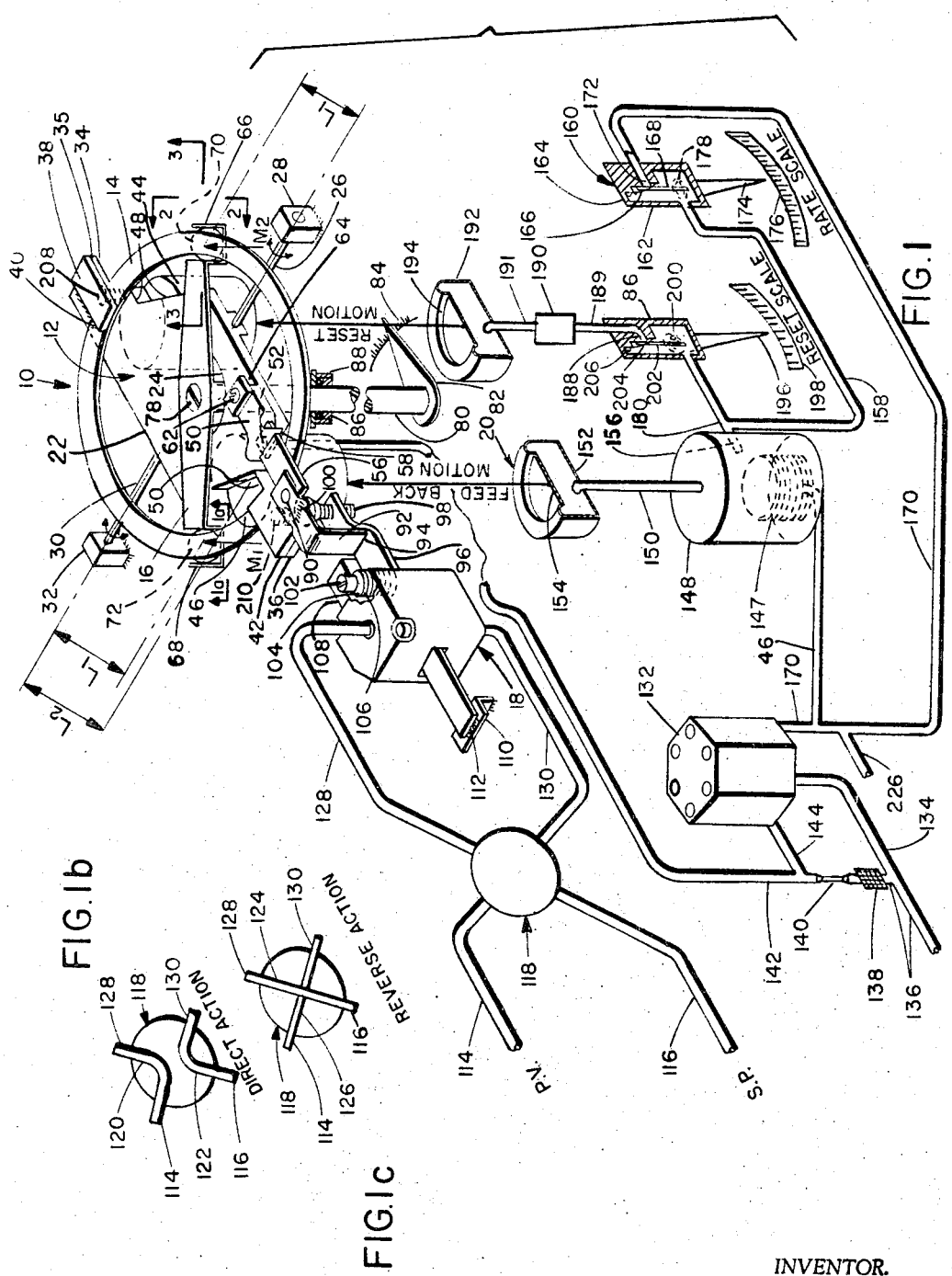
INVENTOR.
ROBERT SCHMITZ
BY Arthur H. Swanson April 23, 1968 R. SCHMITZ 3,379,205
PNEUMATIC FORCE BALANCE CONTROLLER
Filed Oct. 12, 1964 2 Sheets-Sheet 2

INVENTOR.
ROBERT SCHMITZ
BY Arthur H. Swanson

United States Patent Office 3,379,205
Patented Apr. 23, 1968

3,379,205
PNEUMATIC FORCE BALANCE CONTROLLER
Robert Schmitz, Hatboro, Pa., assignor to Honeywell Inc., a corporation of Delaware
Filed Oct. 12, 1964, Ser. No. 403,228
9 Claims. (Cl. 137—86)

The general object of the present invention is to provide an apparatus for transforming its motion being produced by a movable member into a pneumatic pressure whose magnitude is proportional to the input motion.

The present invention relates to improvements in conditioned responsive controlling apparatus and particularly concerns itself with a motion-to-fluid pressure transducer for producing a pneumatic controlling signal that has a preselected direct linear relationship with the magnitude of the motion of the flapper.

More specifically, it is one of the objects of the invention to provide a motion-to-pressure controlling apparatus of the aforementioned type that employs a first plate mounted for rocking motion on a pivot and provides a fulcrum about which a first degree of freedom can be obtained along with a ring member and a bleed valve mounted on the plate, and a means in rotatable contact with this plate and ring which will provide other additional different selected degrees of freedom for the plate.

It is another object of the invention to provide a controller of the aforementioned type in which the means in contact with the plate and ring has a substantially rigid bar, the opposite end portions of which are employed to act as a double cantilever support and pivot for the respective opposite sides of the ring.

It is still another object of the invention to effect economies in the number of parts that are required in controller construction in that the controller disclosed herein does not require atmospheric fluid pressure exhaust chambers and seals between these chambers and additional associated chambers, as has heretofore been required in controllers that use spaced-apart stacked diaphragms as walls of their associated chambers.

It is another object to disclose a controller which, because of its aforementioned built-in motion transferring characteristic, can have a rate or reset capsule added to it or removed from it without being required to replace these units with springs, etc., as has heretofore been the common practice.

It is still another object to provide a motion balance controller construction which employs a deep convoluted diaphragm capsule for the reset and feedback chamber, and hence does not require the gradient of these chambers to be matched as has heretofore been the case in other present-day controllers that employ double-type reset and feedback chambers.

It is another object of the present invention to provide a controller with all of the aforementioned desired motion-transferring components so that it is now possible for the first time to more economically mount many more controllers in any given panel space because of its unique thin width miniaturized construction.

A better understanding of the present invention may be had when the following detailed description is read in connection with the accompanying drawings in which:

FIG. 1 is an exploded isometric view of the controlling apparatus;

FIG. 1*a* is a front elevation view of the spherical bearing shown in FIG. 1;

FIGS. 1*b* and 1*c* show the direct-reverse acting switch used in the controller of FIG. 1;

Figure 1A:
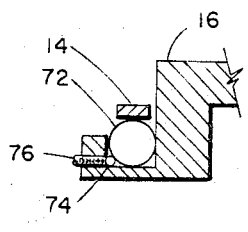

The controlling apparatus 10 shown in FIG. 1 is comprised of a rocker member 12 substantially rigid, ring 14 connected for movement with the rocker member 12, a rotatable double cantilever bar 16 in point contact with the ring 14, a separate motion input member 18 and a feedback member 20 for applying a motion to the rocker 12 to rebalance the characterized selected resistance spring gradient of the ring 14.

The central part 22 of the rocker member 12 is of a plate-shape configuration and has a wall portion 24 that forms an aperture therein. A pivot shaft 26 is shown fixedly connected to the front edge portion of the central part 22 projecting outwardly thereof into pivotal engagement with the bearing block 28. A second portion 30 of the pivot shaft 26 is fixedly connected in a similar manner at the rear edge portion of the central part 22 and is shown projecting therefrom and into pivotal engagement with the bearing block 32. The bearing blocks 28 and 32 thus provide a fulcrum about which the rocker member 12 can be rotated and the means by which a first degree of freedom for this rocker member 12 is established.

The rocker member 12 has portions 34, 36 extending from and forming diametrically-opposite sides thereof. The portion 34 is shown fixedly connected by suitable welding material 35 to an associated L-shaped plate lug 38 and lug 38 is, in turn, fixedly connected in a suitable manner by a welding material 40 for movement with the ring 14. The portion 36, lug 42 and another portion of the ring 14 are fixedly connected for movement with one another in a manner similar to that just described for the portion 34 and lug 38.

The aforementioned rocker member 12, the ring 14 and its shaft portions 26, 30 can thus be pivoted as a unit about the fulcrum 28, 32.

Integral with and projecting from the bottom portion of the central part 22 there is shown a pair of cylindrically-shaped pistons 44, 46. A segment of the portion that forms the top surface of each piston 44, 46 is removed between wall portions 48, 50 to accommodate the rotation of the cantilever bar 16 through a ninety degree angle of rotation.

The upper surface of the rocker member 12 is provided with a nozzle 52 that protrudes therethrough and which is adjustably fixed thereto by screw threads, not shown. A flapper member 56 is shown positioned immediately above the nozzle 52 and being held in pivoted spring engagement therewith at 58 by means of the forked-shaped spring 60 that is retained in fixed threaded engagement with the rocker member 12 by means of the screw 62 and lock washer 64. The construction of the spring biased flapper and the nozzle per se is similar to that disclosed in E. P. Stucka Patent No. 2,898,048.

The unitary rotatable bar 16 is shown extending diametrically across and in spaced relation to the upper surface of the rocker member 12. Each of the outer ends 66, 68 of the bar 16 is of a U-shaped configuration. Spherical-shaped bearings 70, 72 are shown retained between inner wall surfaces of the diametrically-opposite U-shaped ends 66 and 68 of the bar 16. The lower portion of each of the spherical-shaped bearings 70, 72 is retained in place in the manner shown for bearing 72 in FIG. 1a by means of a pin 74 and a pin retaining screw 76. The upper portion of each of the spherical-shaped bearings 70, 72 is retained in slidable point contact with the lower surface of the ring 14.

The central portion of the bar 16 is fixedly connected by means of a screw connection 78 for unitary rotatable movement with the shaft 80 and a proportional band indicating handle 82 that is made integral therewith.

As shown in FIG. 1, the indicating handle 82 can be rotated to any proportional band indication setting on the scale 84. The stationary bearing 86 is employed to retain the longitudinal center line of the shaft 80 at the longitudinal center line of the ring 14 and a thrust bearing 88 is employed to retain the two spherical bearings 70, 72 on the bar 16 in contact with the ring 14.

The motion input member 18 shown in FIG. 1 is comprised of the previously-mentioned flapper 56 that is compressed by a forked-shaped spring 60 against the top of the nozzle 52 and for pivotal movement thereabout. A dimple 90 formed in an inverted L-shaped plate 92 is shown in surface-to-surface engagement with the upper surface of the left end of the flapper 56. The other lower end of the plate 92 is fixedly connected by a suitable welding material 94 to an actuating arm 96.

A coarse zero adjusting screw 98 is threadedly mounted as shown on the arm 96 at its lower end and is shown adjustably engaged in a selected one of many spring loading positions with the lower surface of the bulged portion 100 of the arm 96.

A fine zero adjusting screw 102 having a shoulder 104 thereon in compressed engagement with the spring 106 is shown in threaded engagement with a stationary lug 108.

Since the spring 106 has its lowermost coil in contact with this arm 96, the fine zero adjusting force applied by this spring can be adjusted by rotation of the screw 108.

The arm 96 protrudes through a motion input regulating member 18 and is connected for pivotal movement about its left end on a stationary support member 110 to which it is fixedly attached by means of a suitable welding material 112.

The regulating member 18 is constructed to receive a process variable fluid pressure, P.V., and a selected setpoint pressure, S.P. The process variable and setpoint fluid pressures are supplied by way of conduits 114, 116, the direct-reverse acting switch 118 containing passageways that are schematically shown containing selective passageways 120, 122 or 124, 126 and the conduits 128, 130 to opposing flexible chambers, not shown, that form an internal portion of the motion input regulating member 18.

The resultant motion applied to the arm 96 by the motion input regulating member 18 will,, thus, be a motion that is proportional to the difference in magnitude of the setpoint and the process variable fluid pressures. When direct action is desired, the switch 118 is positioned so that the process variable fluid pressure enters and is applied to the top of the motion input regulating member 18 and the set point fluid pressure enters and is applied to the bottom of the member 18.

When reverse action is desired, the process variable fluid pressure enters and is applied to the bottom of the motion input regulating member 18 and the setpoint fluid pressure enters and is applied to the top of the member 18.

From the aforementioned description, it can be seen that the motion input regulating member 18 thus alters the motion that is applied to the left end of the flapper 56 by the arm 96 and the plate 92 that has a dimpled portion 90 in contact with the left end of the flapper.

A tubing is employed to supply the nozzle 52 and a pilot valve 132 with an air supply from a compressed air source, not shown, by way of the respective tubes 134, 136. The tube 136 is provided with an air filter 138 and a suitable restriction 140. A portion 142 of the tube 136 is made of a flexible plastic material and has a branch 144 thereof for applying the pressure of the fluid in the nozzle 52 as an input motion to the pilot valve 132.

The pilot valve 132 proportionately amplifies the fluid pressure signal it receives from the nozzle 52 and transmits this amplified signal by way of the conduit 146 to the flexible chamber portion 147 of rate unit 148.

The rate unit 148 is connected by way of conduit 150 to a feedback capsule 152 to effect a rapid change in motion of a flexible diaphragm portion 154 that forms the only flexible wall of the feedback capsule 152 for each and every small change that occurs in the magnitude of the pressure signal it receives from the pilot valve 132.

The upper surface of the flexible diaphragm 154, when assembled, is in direct physical contact with the lower surface and side portions of the feedback piston 46 that forms a lower portion of the rocker member 12.

The fluid in the space between the flexible chamber 147 and the outer wall of the rate unit 148 is applied by way of passageways 156, 158 to a rate valve 160. The rate valve 160 has a hollow casing 162. Mounted on an inner wall portion of the hollow casing 162 by means of a screw connection 164 is a leaf spring 166 that operates as a pivot retaining means for the flapper 168. One end of the flapper 168 is positioned to move about the pivot end of the spring 166 to regulate the rate of fluid that is transmitted by way of conduit 170 through the nozzle 172 into the interior of the casing when the indicating pointer 174 is moved to a selected position along the rate scale 176 and the pin 178 connected therewith is simultaneously moved to alter the left end position of the flapper 168.

The aforementioned construction permits a preselected rate of fluid from the pilot valve 132 to be bled by way of bleed valve 168, 172, conduit 158, 156 into the rate chamber surrounding the flexible chamber 147 and simultaneously into the feedback capsule 152 to apply the feedback motion.

When it is also desirable to employ reset, the fluid being bled from the bleed nozzle 168, 172 is applied by way of conduit 158, 180 to the interior of a reset valve 186 through the bleed nozzle 188, conduit 189, reset volume chamber 190 and by way of a conduit 191 into the reset capsule 192. This fluid is then applied as a motion to the undersurface of the piston portion 44 of the rocker member 12.

The fluid under pressure applied in this manner to the reset capsule 192 will thus effect a change in motion of its flexible diaphragm portion 194 that forms its only flexible part for each and every small adjustment of the pointer 196 along the reset scale 198.

It can be seen that the rotation of the pointer 196 along the scale 198 causes the pin 200 attached thereto to act as a cam against one end of the flapper 202. This action will cause the flapper 202 to be pivoted about the free end of the spring 204 so that it is moved away from the nozzle to any one of a number of selected open positions. The other end of the spring is retained by a suitable screw threaded means 206 to the inner wall of the reset valve 186.

Figure 2:
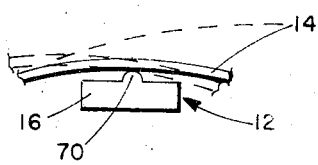
FIG. 2 is a view taken along section line 2—2 of FIG. 1 showing the initial installed position of the ring and the position the ring is in after a feedback motion is applied to the aforementioned rocker plate of the controller.

FIG. 2 which is a section taken along line 2—2 of FIG. 1 shows in solid-line form the initial spring-loaded shape of the spherical ball contacting portion of the ring 14. FIG. 2 also shows in dotted-line form the shape that the aforementioned spherical ball contacting portion of the ring 14 is in when motion has been applied by way of the feedback and/or reset capsules 152, 192 after a change in the motion of the input motion regulating unit 18 occurs.

Figure 3:
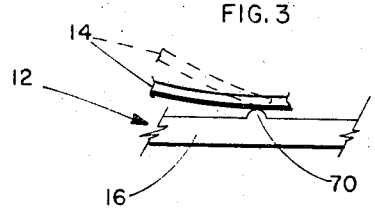
FIG. 3 is a view taken along section line 3—3 of FIG. 1 showing the initial installed position of the ring and the position the ring is in after a feedback motion is applied to the aforementioned rocker plate of the controller.

FIG. 3 is a sectional view taken along line 3—3 of FIG. 1 showing in dotted-line form how the slidable connections between the double cantilever bar 16 and ring 14 assist the ring 14 in providing an adjustable resistant torque and the previously mentioned second degree of freedom of the rocker plate 12.

Figure 4:
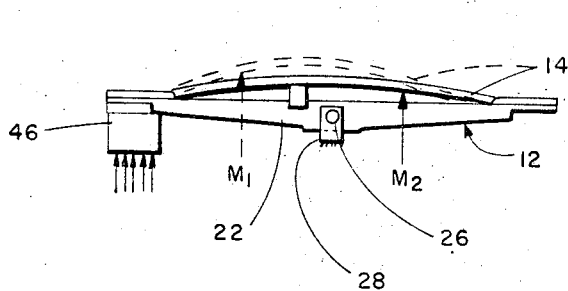
FIG. 4 is a purposely exaggerated view to show how the ring is twisted and how it can introduce a selected one of a number of resistant torques in response to a feedback motion being applied to the controller's rocker arm and the rotatable cantilever pivot bar.

FIG. 4 is an elevation of FIG. 1 purposefully showing in exaggerated form how the resistant torque offered by the ring 14 applies a selected amount of counteracting torque to the motion applied to the rocker plate 22 by, for example, the feedback capsule 152 per se or the feedback capsule and the reset capsule 192.

Figure 5:
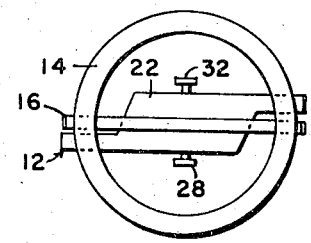
FIG. 5 shows the pivot bar adjustably rotated on the ring in a direction away from the position that is shown in FIG. 1 to a position in which the resistant torque of the ring that counteracts the motion applied to the rocker plate is at a maximum value that is equal to the gradient of the cantilever pivot bar.

FIG. 5 shows the pivot bar 16 rotated away from its FIG. 1 position to a position in which the entire gradient of the double cantilever bar 16 is being applied as a resistant torque to the ring 14 when a feedback motion is applied to the rocker plate 22 to move it about its pivots 28, 32.

Figure 6:
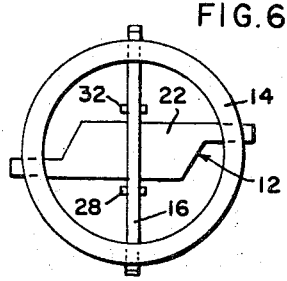
FIG. 6 shows the pivot bar adjustably rotated away from the position that is shown in FIG. 1 to a position in which the aforementioned resistant torque of the ring is zero.

FIG. 6 shows the pivot bar 16 rotated away from its FIG. 1 and FIG. 5 positions to a position in which substantially no gradient of the bar 16 is applied as a resistant torque to the ring 14 when a feedback motion is applied to the rocker plate 22 to move it about its pivots 28, 32.

Figure 7:
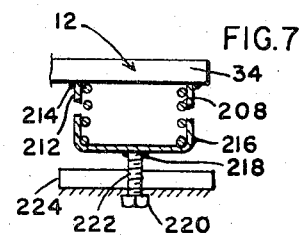
FIG. 7 is a view showing a means for making a manual reset adjustment.

Identical coil springs 208, 210 are shown in dotted-line form in the upper right portion of FIG. 1 and connected to apply a manually-adjusted spring reset load to opposite underside surfaces of the rocker plate 22 in the manner shown for the spring 208 shown in FIG. 7.

FIG. 7 shows a spring retaining sleeve 212 surrounding and in fixed engagement with the underside of the rocker plate portion 34 by means of a suitable welding material 214. FIG. 7 also shows a cup-shaped spring retaining member 216 fixedly connected by welding material 218 for movement with the threaded end of the bolt 220 that, in turn, is threadedly connected at 222 with a stationary member 224.

It can be seen that manual reset zero adjustment can be effected by rotation of the bolt 220 to place the coil spring 208 in different selected compressed conditions against the underside of the rocker portion 34 of the rocker plate 12. A reset zero adjusting structure that is similar to the one just described can be employed to adjust the compressed condition of the other reset zero adjusting spring 210 shown at the left underside of the ring 14 in FIG. 1.

The adjustment of the bar 16 will enable the value $L_1$ to be at a zero value when it is in the position shown in FIG. 6 and to reach a selected maximum value when the bar 16 is in the FIG. 5 position and a maximum counteracting resistant ring twisting or torque is introduced by the ring against the rotation of the rocker member 12 in a manner similar to that shown in FIG. 4. It can also be seen that the value of $L_2$ always remains constant.

The magnitude of the control fluid pressure signal transmitted through the outlet conduit 170, 226 of the pilot valve to a controlled element, for example a control valve in a process line, not shown, is proportionately varied by the controller 10 in the manner previously described as changes in the input motion are introduced by the input regulating means 18.

From the aforementioned description, it can be seen that a unique thin width minaturized motion balance controller has been disclosed for panels where mounting space is at a premium which controller employs a plate mounted for rocking motion on a pivot to provide a fulcrum about which a first degree of freedom of the plate can be obtained along with a ring member and a bleed valve mounted on the plate, and a means in rotatable contact with this plate and ring which will provide other additional different selected degrees of freedom for the plate.

What is claimed is:

1. A motion balance apparatus comprising a plate mounted for rocking motion on a pivot, an electrically deformable ring member with substantial rigidity and a nozzle of a bleed valve fixedly connected for movement with the plate, an adjustable torque resistant means for said ring having a rigid portion in rotatable contact with opposite surfaces of one side of the ring member to adjust the torque of the ring member, an input motion applying means positioned adjacent the nozzle of the bleed valve for altering the fluid pressure output of the bleed valve, a distensible member to apply changes occuring in the fluid pressure output of the bleed valve as a feedback motion to the plate, and the said adjustable means rotatably contacting the opposite surfaces of the one side of the ring member being operable to provide other additional different selected increasing and decreasing degrees of rigidity of the plate as the torque adjusting means is moved along the ring respectively away from and toward the pivot on which the plate is mounted.

2. An apparatus to transform a mechanical displacement into a proportional fluid pressure, comprising a movable input element in the form of a flapper, a pair of fixed pivots, a first plate operably connected for rocking motion on the pivots, a fluid pressure supply nozzle connected to a compressed air source and fixedly connected to the first plate at a position that is adjacent the flapper for movement toward and away from the flapper, a torque ring fixedly connected to spaced-apart peripheral portions of the plate, a rotatable substantially rigid T-shaped proportional band adjusting member comprising a shaft portion extending through an aperture in a center portion of the first plate and having a bar portion extending in opposite directions away from the shaft between a flat surface of the first plate and into peripheral point contact with opposite sides of the torque ring, a pilot valve having an input conduit operably connected to the fluid in the nozzle to receive applied changes in fluid pressure occuring in the nozzle as the flapper is moved toward and away from the nozzle, a feedback capsule connected for joint motion with the first plate, said capsule having an input conduit operably connecting its interior to the pilot valve for receiving changes in applied output fluid air pressure therefrom as changes in fluid air pressure in the nozzle and its input conduit take place, and the T-shaped member being rotatably connected to bring its contacting portions into different proportional band point contacting positions with opposite portions of the ring and thereby alter the inherent resistant torque offered by the ring in response to a change occurring in the position of the flapper with respect to its associated nozzle and the resulting change in the magnitude of the fluid pressure occurring in the feedback capsule.

3. An automatically balanced controlling apparatus, comprising a fulcrum, a plate member mounted for seesaw movement on the fulcrum, a torque ring constructed of a stiff material fixedly connected to portions of the member that are on opposite sides of the fulcrum, a manually-adjusted bar operably positioned for physical slidable engagement with the ring on the member and for physical point contact with portions of the ring that are diametrically opposed to one another and on opposite sides of the fulcrum, a nozzle of a bleed valve operably connected for movement with the plate member, a flapper juxtapositioned the nozzle to regulate the rate of a supply of fluid flowing therefrom in accordance with the magnitude of motion being applied by a motion input regulating means, and an expansible means having a passageway operably connecting it to the fluid in the nozzle and thereby transmitting variations in the magnitude of the fluid pressure as a feedback motion to the plate member.

4. The controlling apparatus as defined in claim 3, wherein the manual adjustment of the bar from one ring-engaging position to another alters the magnitude of resistant torque offered by the ring in response to a change in the magnitude of fluid in the expansible feedback means.

5. An automatically balanced controlling apparatus, comprising a fulcrum, a plate member mounted for seesaw movement on the fulcrum, a torque ring fixedly connected to the member for movement therewith, a bar operably positioned for physical sildable point contact engagement with diametrically opposite portions of the ring, a nozzle of a bleed valve operably connected for movement with the plate member, a flapper juxtapositioned the nozzle to regulate the rate of a supply of fluid flowing therefrom in accordance with the magnitude of motion being applied by a motion input regulating means, and an expansible means having a passageway operably connecting it to the fluid in the nozzle and thereby transmitting variations in the magnitude of the fluid pressure as a feedback motion to the plate member.

6. A motion balance controller, comprising a stationary fulcrum, a deflectable means mounted for movement on the fulcrum to provide a first degree of freedom for the deflectable means, a nozzle portion of a bleed valve connected for movement with the deflectable means, a twistable ring member connected on opposite sides of the fulcrum for movement with the deflectable means, a double cantilever member positioned between the deflectable means and the twistable ring member and in physical rotatable contact with two points on the twistable member to provide different varying degrees of rigidity for the deflectable means to which the twistable member is connected, a movable bleed regulating portion for the valve, a motion input regulating means operably connected for movement with the last-mentioned portion of the valve to regulate the rate of a supply fluid flowing from the nozzle, and a feedback means operably connected to apply a motion to the deflectable means that is proportional to the magnitude of the fluid in the nozzle portion of the bleed valve.

7. A spring gradient adjusting apparatus for use in a motion balance controlling apparatus, comprising a stationary fulcrum, a deflectable means mounted for movement on the fulcrum, a torsion ring having spaced-apart portions fixedly connected to the deflectable means, a rod, two arm portions extending from the rod to form a double cantilever portion, the respective arms being positioned to extend between and in rotatable contact with diametrically opposite portions of the torsion ring, the angular displacement of the arms from one contact position on the ring to another being effective to selectively vary the amount of gradient that the arms of the cantilever portion introduce into the torsion ring to stiffen the deflectable means against any motion applied to the deflectable means, a nozzle of a bleed valve is mounted on the deflectable means for movement toward and away from a flapper, a separate motion-applying means is operably connected to the flapper to move the flapper toward and away from the nozzle in accordance with changes in the magnitude of a variable, a pilot valve is connected to the nozzle, a distensible feedback member is operably connected to the pilot valve, the deflectable means and nozzle being operable for joint movement to a motion balance position with the distensible member when the motion-applying means alters the position of the flapper with respect to the nozzle.

8. The spring gradient adjusting apparatus defined by claim 7, wherein the distensible member is a diaphragm capsule.

9. The spring gradient adjusting apparatus defined by claim 7, wherein the distensible member is a diaphragm capsule, a rate unit is employed between the pilot valve and the diaphragm capsule, a fluid pressure reset unit is operably connected between the rate unit and the second capsule and the second capsule is positioned to apply a motion to the deflectable means in a direction that is opposite to that which is applied by the feedback capsule.

References Cited

UNITED STATES PATENTS

| | | | |
|---|---|---|---|
| 2,360,889 | 10/1944 | Philbrick | 137—86 X |
| 2,476,104 | 7/1949 | Mason | 137—86 X |
| 2,585,347 | 2/1952 | Robins | 137—85 |
| 2,742,917 | 4/1956 | Bowditch | 137—86 |
| 3,078,738 | 2/1963 | Siegel | 137—85 X |

ALAN COHAN, *Primary Examiner.*

UNITED STATES PATENT OFFICE
CERTIFICATE OF CORRECTION

Patent No. 3,379,205                                April 23, 1968

Robert Schmitz

It is certified that error appears in the above identified patent and that said Letters Patent are hereby corrected as shown below:

In the heading to the drawings, sheets 1 and 2, line 2, and in the heading to the printed specification, line 2, "Pneumatic Force Balance Controller", each occurrence, should read -- Pneumatic Motion Balance Controller --.

Signed and sealed this 15th day of December 1970.

(SEAL)
Attest:

Edward M. Fletcher, Jr.                        WILLIAM E. SCHUYLER, JR.
Attesting Officer                                     Commissioner of Patents